(12) United States Patent
Baldini et al.

(10) Patent No.: US 8,738,737 B2
(45) Date of Patent: May 27, 2014

(54) PORTABLE MEDIA PLAYER FOR RECORDING AND PLAYBACK OF STREAMED DIGITAL CONTENT

(75) Inventors: Massimo Baldini, Beverly Hills, MI (US); Jacob R. Sigal, Ferndale, MI (US); Thomas R. Denton, Orion, MI (US); Donald J. Ebben, Novi, MI (US)

(73) Assignee: Myine Electronics, LLC, Ferndale, MI (US)

( * ) Notice: Subject to any disclaimer, the term of this patent is extended or adjusted under 35 U.S.C. 154(b) by 374 days.

(21) Appl. No.: 13/096,069

(22) Filed: Apr. 28, 2011

(65) Prior Publication Data

US 2011/0270955 A1 Nov. 3, 2011

Related U.S. Application Data

(60) Provisional application No. 61/328,849, filed on Apr. 28, 2010.

(51) Int. Cl.
*G06F 15/16* (2006.01)
*H04H 20/71* (2008.01)

(52) U.S. Cl.
USPC .......................................... 709/219; 370/312

(58) Field of Classification Search
USPC .......................................... 709/219; 370/312
See application file for complete search history.

(56) References Cited

U.S. PATENT DOCUMENTS

| | | | |
|---|---|---|---|
| 7,945,934 B2* | 5/2011 | Margis et al. | 725/75 |
| 8,175,582 B2* | 5/2012 | Benco et al. | 455/414.1 |
| 2008/0106600 A1* | 5/2008 | Benco et al. | 348/157 |
| 2012/0099514 A1* | 4/2012 | Bianchetti et al. | 370/312 |

* cited by examiner

*Primary Examiner* — Asghar Bilgrami
(74) *Attorney, Agent, or Firm* — Harness, Dickey & Pierce, P.L.C.

(57) ABSTRACT

A portable media player and a car media player are disclosed. In either implementation the media player may be used to record digital content as it is streamed over a wide area network (WAN). The recorded digital content may then be played back using the media player and associated controls on the media player. In one implementation the media player makes use of a stored program and an external computer so that digital content recorded by the computer may then transferred from the computer on to the media player for storage and playback.

7 Claims, 6 Drawing Sheets

PORTABLE MEDIA PLAYER FOR RECORDING AND PLAYBACK OF STREAMED DIGITAL CONTENT

CROSS REFERENCE TO RELATED APPLICATIONS

The present application claims priority from U.S. Provisional Patent Application Ser. No. 61/328,849, filed Apr. 28, 2010, the entire disclosure of which is hereby incorporated by reference into the present disclosure.

FIELD

The present disclosure relates to portable media players, and more particularly to a portable media player well adapted to store and play back digital content streamed over a wide area network from a remote content source to the portable media player.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Portable media players are becoming increasingly popular. To download music, these media players are typically plugged into a computer. Thereafter, a user initiates a computer program resident on the computer. Typically, the computer program is bundled into an operating system of the computer. Alternatively or additionally, the computer program may be downloaded from an Internet website and stored on the computer.

Using the computer program, the user interactively downloads music from the Internet onto the computer. The downloaded music is stored on the computer. The user typically transfers the downloaded music from the computer to the media player. The user can then disconnect the media player from the computer and listen to the music stored in the media player.

SUMMARY

In one aspect the present disclosure relates to A method for recording and saving streamed digital content over a wide area network (WAN). The method may comprise a plurality of operations including using a media player to store a program, the program being configured to facilitate recording of the streamed digital content from a remotely located content source over the WAN. The media player may be configured with an interface adapted to communicate with a computing device. The media player may be used to establish a communications link with the computing device. The program may be used from the computing device to control recording and encrypting of selected streaming digital content from the remotely located content source over the WAN. The program may also be used to facilitate storing, decryption and playback of the selected digital content from the media player.

In another aspect the present disclosure relates to a method for recording and saving streamed digital content over a wide area network (WAN). The method may comprise using a media player to store a program, with the program being configured to facilitate recording of the streamed digital content over the WAN. The method may also include configuring the media player to have a plurality of controls to enable a user to control a playback of the streamed digital content on the media player. The method may further include configuring the media player with an interface adapted to communicate with a computing device, and using the media player to establish a communications link with the computing device. The method may also involve automatically using the program to help control operation of the computing device and to display a graphical user interface (GUI) on a display component associated with the computing device. The GUI may be adapted to receive a selection from a user relating to specific digital content to download over the WAN. The method may also include using the program and the GUI to initiate recording of streaming digital content over the WAN to the computing device, and using the program to facilitate a transfer of the recorded digital content from the computer to the media player where it may be stored, whereafter the recorded digital content is available for use by the user from the media player.

In still another aspect the present disclosure relates to a method of providing stored digital audio content to a remotely located frequency modulated (FM) radio having a tunable FM receiver. The method may include using a portable media player to store a program, with the program being configured to facilitate recording of the streamed digital content over the WAN. The method may also include configuring the portable media player to have a user interface that includes a plurality of controls to enable a user to control a playback of the streamed digital content on the portable media player and to select a specific FM frequency that audio content will be transmitted on from the portable media player. The method may also include using the program of the portable media player to communicate with a computing device over an established communications link between the portable media player and the computing device, and to obtain, using the computing device, selected digital audio content being broadcast from a remote content source over a wide area network. The program may be used to relay the selected digital audio content received by the computing device to the portable media player and to store the selected digital content on the media player. The method may also include breaking the communications link between the portable media player and the computing device, and then placing the portable media player within a predetermined proximity of the FM receiver. The method may include receiving a command at the portable media player to initiate use of an FM transmitter of the portable media player to wirelessly transmit the stored selected digital content. The stored, selected digital content may be transmitted in analog form to the FM receiver on the specific FM frequency for playback on the FM radio.

In still another aspect the present disclosure relates to a media player apparatus for recording and playing back digital content. The apparatus may comprise a control module and a program adapted to be stored in a memory associated with the control module. The program may be used for facilitating recording of digital content from a remote digital content source. A communications port may be used for facilitating a communications link between the control module and a remote computing device. A display system may be provided in communication with the control module for displaying information associated with one of a selection of stored digital content files or a playback of the stored digital content files. An output port of the apparatus may be used for playback of the stored digital content files to an audio transducer. The program may further be configured to assist in establishing a communications link with the remote computing device. The program may be used by the remote computing device to facilitate selection and recording of streamed digital content from the remote content source over a wide area network (WAN) to the remote computing device. The program may also be used by the remote computing device to encrypt the streamed digital content received by the remote computing device into encrypted digital content. The program may also be used to facilitate transfer of the encrypted digital content from the remote computing device over the communications link to the media player apparatus. The program may also be used to facilitate decryption and playback of the encrypted digital media content on the media player apparatus.

In still another aspect the present disclosure relates to a method for obtaining and recording streaming audio content streamed over a wide area network (WAN). The method may comprise providing a portable electronic device (PED) able to receive and at least temporarily store recordings of streaming audio content transmitted over the WAN. The PED may be further able to play back the recorded audio content downloaded over the WAN. A program may be provided that is adapted to run on a remote computer, where the remote computer is not part of the PED. The program, while running on the remote computer, may facilitate access to, selection of, and recording and encryption of audio content streamed over the WAN in accordance with a predetermined digital rights management policy. The program may be used to initiate the streaming of selected audio content over the WAN in response to a query for audio content initiated from the PED. The program may also facilitate control of the PED so that the PED may be used to receive, store and play back the streaming audio content.

In still other implementations, the systems and methods described above may involve the use of a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
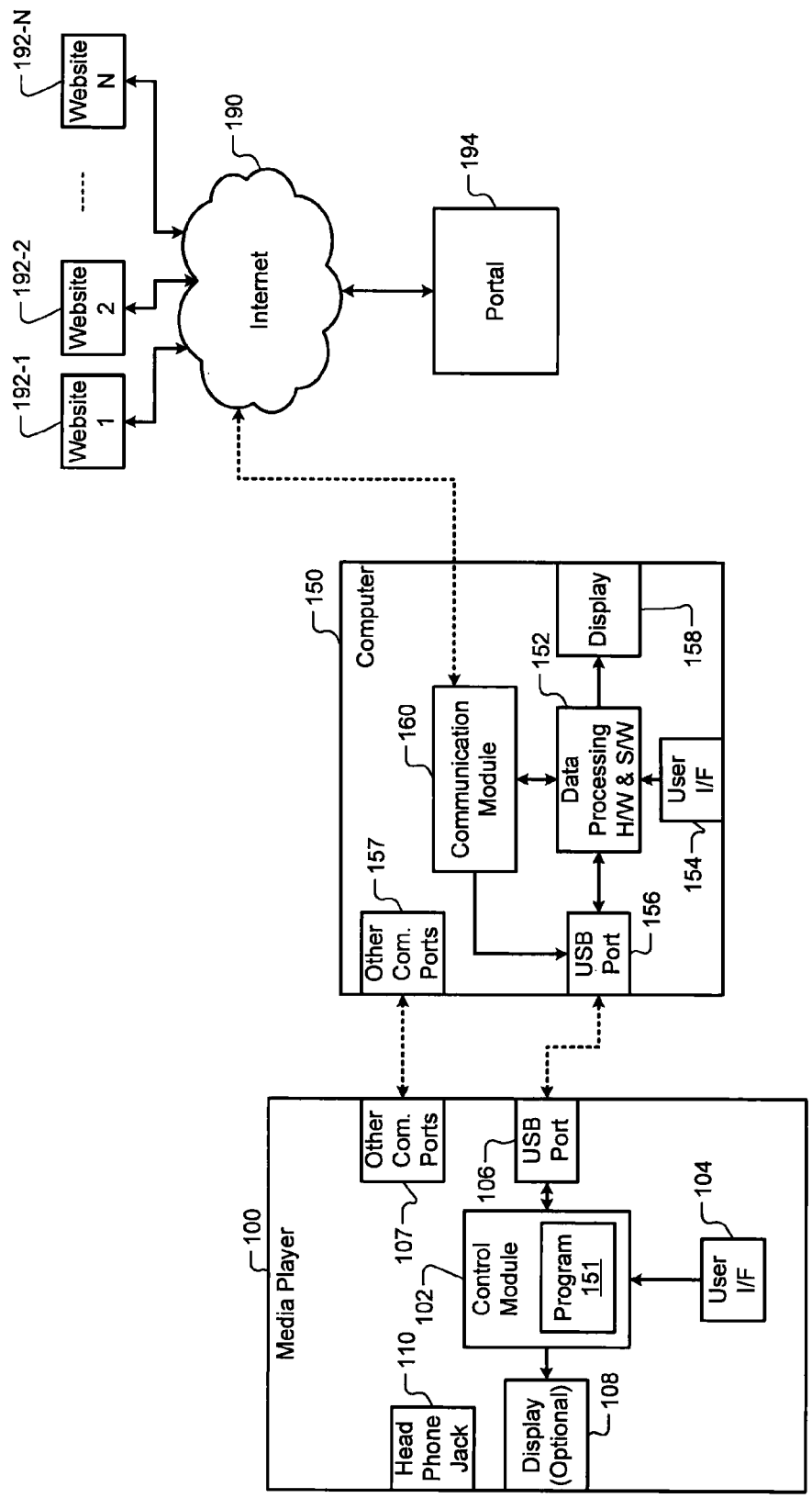
FIG. 1A is a functional block diagram of a media player that communicates with a computer and the Internet.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure relates to a portable media player that plugs into a computer and that automatically records audio files (e.g., streaming music) being streamed over a wide area network (WAN), for example over the Internet. The portable media player may also be used to record Internet radio content being streamed from virtually any Internet radio site over the Internet. Thus, both music and talk-radio content from Internet radio stations and other Internet content sources are able to be recorded using the portable media player of the present application. For convenience, the Internet will be referenced throughout the following discussion as the WAN that is being used, although it will be appreciated that the streaming audio may be obtained over a local area network (LAN) or any other form of wireless or wired network. The portable media player (media player) may be connected to a computer, for example a personal computer (PC), a Macintosh computer (MAC) (collectively computer), or any other form of desktop or laptop computer. The computer may be in communication with the portable media player via a suitable interface bus, for example a universal serial bus (USB) port of the portable media player. Alternatively, the BLUETOOTH® wireless communications protocol could be used to establish a wireless link between the portable media player and the computer. The media player may include an executable application program (program) that is used to record the audio files from the Internet. The program is neither part of an operating system of the computer nor downloaded from the Internet. Furthermore, the program is not permanently stored on the computer but rather only loaded into a suitable memory, such as a cache memory, of the computer, for temporary use. Instead, the program is stored on the media player and may be automatically loaded into (i.e., launched), and executed on, the computer immediately after the media player is connected to the computer via the USB connection or other suitable connection.

The media player may activate the program without user interaction when the media player is plugged into the computer. The program may execute on the media player without user interaction. The computer may access the program stored in the media player and may execute the program automatically without user interaction.

When executed, the program may display a graphical user interface (GUI) on a display device associated with the computer. Using the GUI, a user may select audio content to play through speakers of the computer and record. For example, the user may input search criteria including genre, language, geographic location, and so on using the GUI. Subsequently, the program may connect the computer to a predetermined portal via the Internet. The portal is an Internet stream aggregator and maintains a list of websites that provide audio content, for example Internet radio stations. The portal may authenticate the user through information provided by the program and, based on the search criteria input by the user, provide uniform resource locators (URLs) that provide the selected audio content. Alternatively, the user may directly enter a URL (e.g., a website address of a radio station) using the GUI.

Subsequently, the program initiates connecting the computer to the URL, records the streaming audio (e.g., either music or Internet radio talk-radio content), saves the files from the URL, and begins processing the digital audio being streamed into the computer. The program converts the streaming content being received by the computer into a preferred compressed format (e.g., Ogg format), encrypts the compressed content, and controls the transfer of the streamed audio content from the computer to the media player. The computer does not save the converted and encrypted audio content but rather simply passes it to the media player as the streamed audio content is converted and encrypted. Thus, only one file copy of the streamed, encrypted audio content exists when the recording process is completed, and that file copy exists on the media player. The recording operations described above may further be performed in accordance with a predetermined digital rights management policy.

The program operates on the media player to decompress and decrypt the recorded audio file so that the audio file may be played back on the media player. Also, the streaming audio content may be played back on the computer as it is received over the Internet by the computer.

Occasionally, the user may choose a genre instead of specifically a streaming media URL. In this instance the program will go out and find a station that fits within that genre, and when a station is located the program will automatically begin recording content from the selected station. The program may also automatically transfer the converted audio content to the media player for decompression and decryption without any user interaction.

The media player may be implemented in at least two ways. In a first implementation, the media player may include a battery but does not include a frequency modulation (FM) radio transmitter. For easy reference, the first implementation may be called a "portable media player". The portable media player may include a headphone jack that connects to an audio transducer, such as a headphones set, and outputs the audio content played by the first media player through the headphones. The portable media player includes an amplifier that amplifies the decrypted and decompressed audio content and provides the amplified output to the headphone jack. The user is able to control the gain of the amplifier via a suitable control on the media player such that the volume of the audio content output from the headphone jack may be controlled. The battery of the portable media player may be rechargeable.

In a second implementation the media player may not include the battery and the headphone jack, and instead may include the FM radio transmitter and an auxiliary output jack (AUX Port OUT). For easy reference, the second implementation may be called a "car media player". The car media player may be configured with a power plug that plugs into a cigarette lighter adapter (CLA) of a vehicle or any other +12v power port included in the interior area of the vehicle. The car media player may then draw power from the CLA (i.e., from a power source (e.g., a battery) of the vehicle). Accordingly, there is no need for the car media player to include its own battery. Optionally, however, a battery could still be provided in the car media player, with conventional internal power sensing circuitry that is configured to make use of the internal battery unless power is detected being received on its power plug. In this optional configuration, if power is detected on its power plug, the battery would be internally electrically switched out from the other internal electrical components of the car media player without any user intervention.

Additionally, the FM radio transmitter of the car media player may communicate with an FM radio receiver of the vehicle. Typically, the user may tune the FM radio transmitter to a frequency that is available and is unused for broadcasting on the FM radio receiver. Alternatively, the program may control the FM radio transmitter so that the FM radio transmitter may automatically find an unused FM frequency, and automatically tune to the unused FM frequency shortly after the car media player is plugged into the CLA. Automatic tuning may be particularly useful when the unused frequencies change depending on the geographic location of the vehicle.

When the FM radio transmitter and the FM radio receiver are tuned, the audio content stored in the car media player is decompressed, decrypted and then transmitted by the FM radio transmitter to the FM radio receiver as an analog signal. The FM radio receiver may include conventional preamplifier and amplifier stages that preamplify and then amplify the analog audio signal. The amplified analog signal may then be output to speakers in the vehicle that are connected to an output of amplifier of the FM radio receiver.

Instead of or in addition to the FM radio transmitter, the car media player may include an auxiliary (AUX) output port. The auxiliary output port is different than the headphone jack. For example, while an amplifier may precede the headphone jack to provide volume control in the portable media player, the auxiliary output port is not preceded by an amplifier in the car media player. The auxiliary output port can be connected to an auxiliary input port on the FM radio receiver via a suitable cable. The audio content stored in the car media player is transmitted to the FM radio receiver via the auxiliary ports and the cable after being decrypted and decompressed by the program. The FM radio receiver receives the audio content in decrypted, decompressed analog format and outputs it to the speakers. The FM receiver provides amplification and volume control.

In some implementations, the media players disclosed herein may include a wireless transmitter. For example, the wireless transmitter may be a BLUETOOTH® (hereinafter "BT") transmitter. Alternatively, the wireless transmitter may comply with one or more Institute of Electrical Electronics Engineers (IEEE) 802.11 specifications. Using the wireless transmitter, the media players may communicate with wireless audio receivers and/or speakers equipped with compatible wireless receivers. The media players may wirelessly transmit the audio content stored in the media players to the wireless audio receivers and/or speakers. The wireless audio receivers and/or speakers may be located in homes, offices, vehicles, and so on.

Referring now to FIG. 1A, a functional block diagram of a generic media player 100 according to one embodiment of the present disclosure is shown. Details and differences of the implementations of the media player 100 are shown in subsequent drawings.

The media player 100 may comprise a control module 102, a user interface (I/F) 104, a USB port 106, other communication ports 107, a display 108 (optional), and a headphone jack 110. The other communication ports 107 may include wireless communication ports used to communicate with computers, wireless audio receivers and/or speakers, and so on. For example, the other communication ports 107 may include, but are not limited to, infrared ports, ports that comply with BLUETOOTH® and/or IEEE 802.11 specifications, and so on. The display 108 may include a liquid crystal display (LCD) or other suitable display.

The control module 102 controls operations of the media player 100. The operations include, but are not limited to, communicating with a computer 150, receiving converted, compressed streaming audio from the program when the program is executed on the computer 150, and playing the audio content on the media player 100 after same is stored on the media player. The user interface 104 includes push-buttons that can be used to enter commands to the control module 102. For example, the commands may include play, pause, rewind, fast-forward, volume control, save, delete, and so on.

The display 108 may show the commands, titles of the audio files being played, and/or status of the media player 100. For example, the commands may be indicated using suitable icons. The status of the media player 100 may include state of charge of the battery, amount of memory used/free on the media player 100 to store the audio files, and so on.

The computer 150 may be a PC, a MAC, a laptop or any other type of computing device that can connect to the Internet 190 and a portal 194. Through the Internet 190, the computer 150 can connect to a website-1 192-1, a website-2 192-2, . . . , and/or a website-N 192-N (collectively websites 192), where N is an integer greater than or equal to 1.

The computer 150 may comprise data processing hardware and software (hereinafter data processing module or DPM) 152. Additionally, the computer 150 may comprise a user interface (I/F) 154, a USB port 156, other communication ports 157, a display 158, and a communication module 160. The user interface 154 may include a keyboard, a mouse, and so on. The other communication ports 157 may be similar to the other communication ports 107 of the media player 100. The display 158 may include a liquid crystal display (LCD) or other suitable display. The communication module 160 communicates over the Internet 190 with the portal 194.

The USB port 106 of the media player 100 plugs into the USB port 156 of the computer 150. Alternatively, the media player 100 and the computer 150 may communicate via the other communication ports 107, 157. Hereinafter, references to the USB ports 106, 156 are for example only. One of ordinary skill in the art will appreciate that communications performed via the USB ports 106, 156 may instead be performed via the other communication ports 107, 157, respectively.

When the media player 100 is plugged into the computer 150 via the USB ports 106, 156, the control module 102 senses this condition and activates (i.e., launches) the program stored in the control module 102. For convenience the executable application program has been identified with reference number 151 in FIG. 1A. The computer 150 accesses (i.e., loads) the program 151 stored in the control module 102 via the USB ports 106, 156. The DPM 152 reads the program 151 from the control module 102 and executes the program. The DPM 152 may display the GUI on the display 158. The user may then input search criteria (i.e., select genre and so on) using the user interface 154.

For example, using the user interface 154, the user may select audio content to record using one or more of the following: type of music such as "Rock," "Country," and so on. Additionally, the user may select names of artists, radio stations, titles of radio shows, and so on. The user may also select a specific URL (e.g., of a specific radio station).

Further, the GUI may allow the user to input keywords (e.g., gospel, nursery, etc.), which the user may use to select the audio content to record. The user may also select time of the day at which to search and record the selected audio content. Further, the user may set a duration (i.e., a block of time (e.g., 30 minutes)) for which the selected audio content may be recorded onto the media player 100.

In some implementations, the GUI may provide multiple levels of selection. For example, a first level of the GUI may appear on the display 158 when the media player 100 is plugged into the computer 150. The first level may list broad categories of audio content and a window to type in a URL. The user may type a specific URL or may select one or more of the broad categories.

On selecting one of the broad categories, a second level of sub-categories may appear on the display 158. For example, the second level may allow the user to make further selections within the selected broad category. Additional levels may be generated to facilitate still further selections. The user may make the selections by clicking the mouse on buttons (i.e., fields) of the GUI. Alternatively or additionally, the user may use a keyboard to enter the selections in fields of the GUI.

The GUI may allow the user to save the selections (i.e., the search criteria) or to save changes made to previous selections. The selections may be saved on the media player 100. When the media player 100 is plugged into the computer 150 the next time, the previously saved selections may be used as default selections unless currently altered by the user.

Figure 1B:
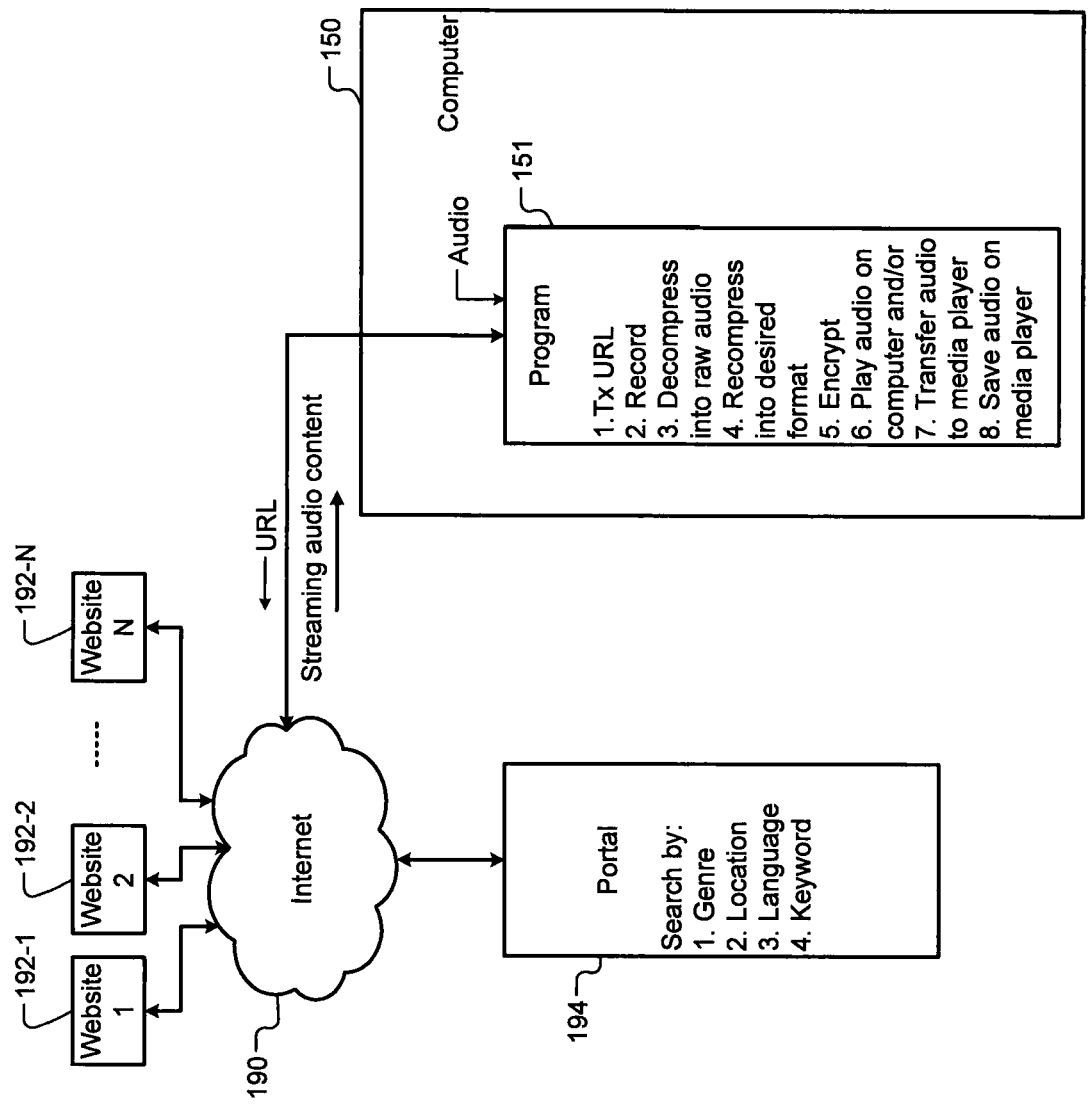
FIG. 1B depicts a software flow diagram for the media player of FIG. 1A.

Referring now to FIG. 1B, a software flow diagram is shown. In FIGS. 1A and 1B, the communication module 160 performs the following functions under the control of the program 151.

The communication module 160 may communicate with the portal 194 over the Internet 190. The portal 194 may maintain a list of websites 192 that provide different audio content. For example, the portal 194 may maintain a list of websites of Internet radio stations that broadcast music, news, talk-radio content, and so on. The portal 194 may also determine legitimacy, reliability, and stability of the websites 192.

Additionally, the portal 194 may authenticate the user. For example, the portal 194 may authenticate the user based on an identifier (e.g., a code or a key) embedded in the program 151. The portal 194 may receive the identifier from the communication module 160 and may verify the identifier before the program 151 is allowed to initiate the streaming of audio content to the computer 150, and the recording of the audio content.

The communication module 160 may output the search criteria (e.g., genre, location, language, and/or keyword) input by the user to the portal 194. Based on the search criteria received, the portal 194 searches the Internet 190 for websites 192 that provide the selected audio content. When a URL of a website that provides the selected audio content is found, the communication module 160 receives the URL from the portal 194. The communication module 160 communicates with the website using the URL and records the selected audio content as it is streamed over the Internet to the computer 150. The computer 150 may temporarily store in, in a volatile memory such as a cache memory, portions of the streamed audio content received from the selected website to facilitate decompression of the audio content into raw audio, conversion (and re-compression) into a format that the media player can understand, and then encryption of the compressed audio content into an encrypted format.

Alternatively, the communication module 160 may directly search the Internet 190 for an individual website specified by the user. The communication module 160 may search the individual website for audio content according to the search criteria input by the user. For example, the user may specify one or more of the websites 192 from which to download and record the selected audio content. The communication module 160 may communicate with the website using the URL specified by the user and record the digital audio content streamed from the selected website according to the search criteria input by the user.

Subsequently, under the control of the program 151, the communication module 160 may decompress the streamed audio from a compressed state into raw audio. The communication module 160 may then convert the raw audio into a compressed file format (e.g., Ogg format) that the media player 100 understands, and may then encrypt the streaming audio content. The communication module 160 then transfers the compressed, encrypted streaming audio content to the media player 100 via the USB port 156.

The media player 100 receives the compressed, encrypted digital audio files via the USB port 106. The control module 102 stores the compressed, encrypted digital audio files and then plays the audio content, after decrypting, decompressing and digital-to-analog converting the files, when the user enters a play command via the user interface 104. In some implementations, the program 151 may play the streaming audio content on the computer 150 before transferring the encrypted audio files to the media player 100.

Figures 2A, 2B:
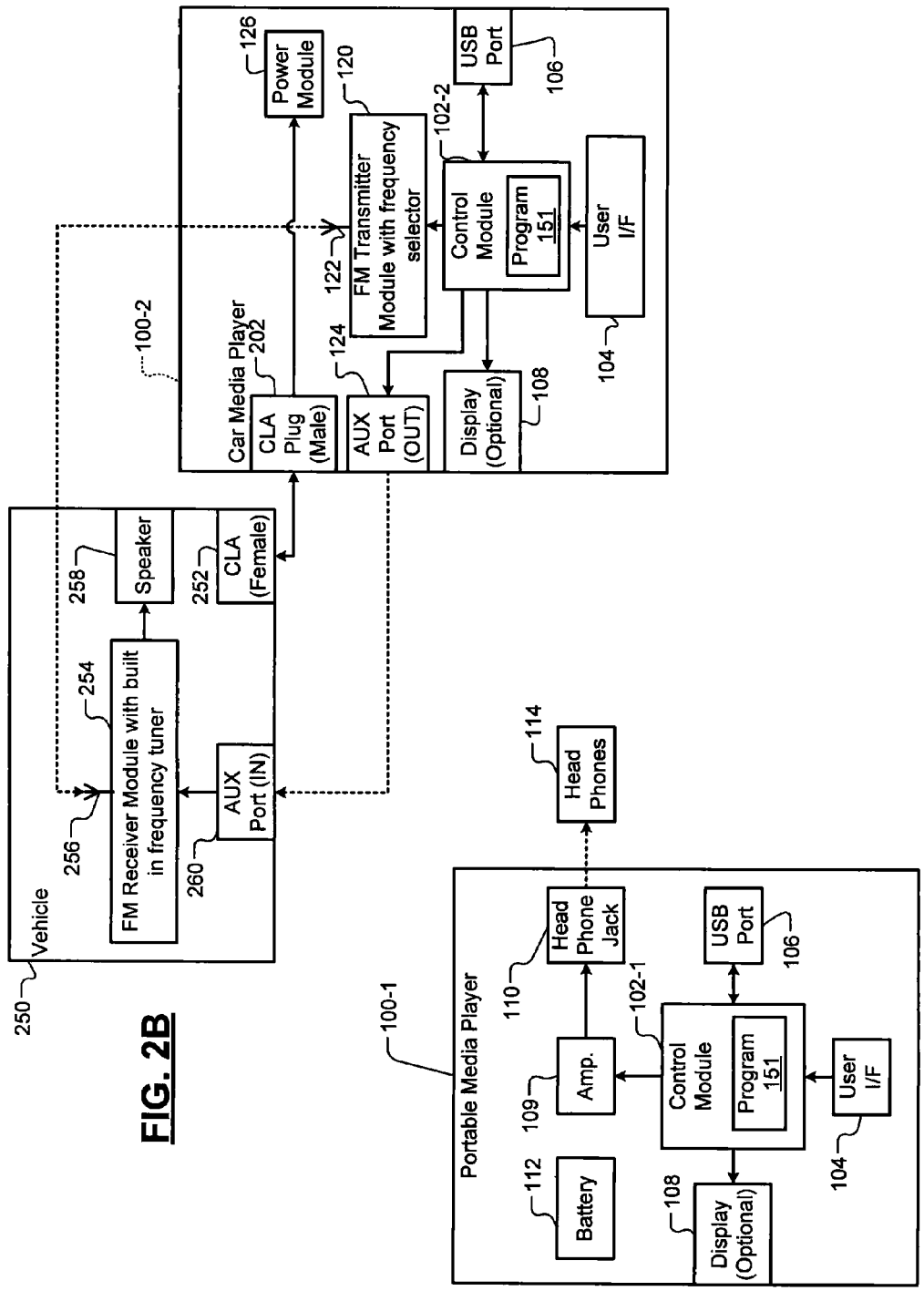
FIG. 2A is a functional block diagram of a portable media player.
FIG. 2B is a functional block diagram of a car media player that works in a vehicle.

Referring now to FIGS. 2A and 2B, the first and second implementations of the media player 100 are shown in detail. In FIG. 2A, a portable media player 100-1 is shown. In FIG. 2B, a car media player 100-2 is shown.

In FIG. 2A, the portable media player 100-1 may comprise a control module 102-1, the user interface 104, the USB port 106, the display 108 (optional), an amplifier 109, the headphone jack 110, and a battery 112. Headphones 114 may be plugged into the headphone jack 110. The control module 102-1 stores the compressed, encrypted, digital audio files and outputs the audio content of the files to the headphones 114 via the headphone jack 110, after the content is decompressed, decrypted and D/A converted by the program 151 while operating on the control module 102. The amplifier 109 provides amplification and volume control when the audio content is output to the headphones 114 as an uncompressed, decrypted and D/A converted signal.

The battery 112 provides power to the portable media player 100-1. The battery 112 may be a rechargeable nickel cadmium battery, a rechargeable lithium battery, or any other suitable type of rechargeable battery. The battery 112 may even be a non-rechargeable battery. If the battery is of the rechargeable variety, then it may be charged via the USB port 106 when the media player 100-1 is connected to the computer 150. Alternatively or additionally, the battery 112 may be charged using an external charging adapter (not shown). For example, the external charging adapter may plug into an AC wall outlet or into a CLA of a vehicle.

In FIG. 2B, the car media player 100-2 is shown coupled to a vehicle 250. The car media player 100-2 comprises a control module 102-2, the user interface 104, the USB port 106, the display 108 (optional), a FM transmitter module 120 with a frequency selector 120a, an antenna 122, an auxiliary (AUX) output port 124, a power module 126, and a CLA plug (male) 202.

The vehicle 250 may comprise a CLA jack (female) 252, an FM receiver module 254 with a built in frequency tuner 254a, an antenna 256, a speaker 258, and an AUX input port 260. The CLA plug 202 of the car media player 100-2 plugs into the CLA jack 252 of the vehicle 250. The power module 126 receives DC power from the CLA jack 252 via the CLA plug 202. The power module 126 uses the DC power to supply a regulated DC supply voltage to the various electronic components of the media player 100-2.

The control module 102-2 stores the compressed, encrypted audio files and may output the audio content of the compressed, encrypted audio files to the FM transmitter module 120 after same are decompressed, decrypted and D/A converted. The user may tune the FM transmitter module 120 and the FM receiver module 254 to a selected unused and open frequency. The user may select the frequency using the user interface 104.

Alternatively, as soon as the car media player 100-2 is plugged into the CLA jack 252 and powered up, the FM transmitter module 120 may being scanning for unused and open frequencies useable by the FM receiver module 254, and may detect those specific FM frequencies that are unused by the FM receiver module 254. The FM transmitter module 120 may then automatically tune to a frequency that is unused by the FM receiver module 254.

The FM transmitter module 120 may transmit the decompressed, decrypted and D/A converted audio content as an analog signal via the antenna 122. The FM receiver module 254 may receive the analog audio content via the antenna 256. The FM receiver module 254 may output the audio content in the analog format to the speaker 258. The FM receiver module 254 amplifies the audio content and provides volume control when the audio content is output to the speaker 258.

Alternatively, the control module 102-2 may be hard wired to the FM receiver module 254. In this instance, the analog audio content may be transmitted using the AUX output port 124 of the car media player 100-2. The user may accomplish the hard wiring by connecting a suitable cable between the AUX output port 124 of the car media player 100-2 and the AUX input port 260 associated with the FM receiver module 254 in the vehicle 150. A preamplifier portion of the FM receiver module 254 may then receive the audio content via the AUX input port 260. The FM receiver module 254 may amplifier and pass the audio content in analog form to the speaker 258. An amplifier (not shown) associated with the FM receiver module 254 amplifies the audio content and provides volume control when the analog audio content is output to the speaker 258.

Figure 3A:
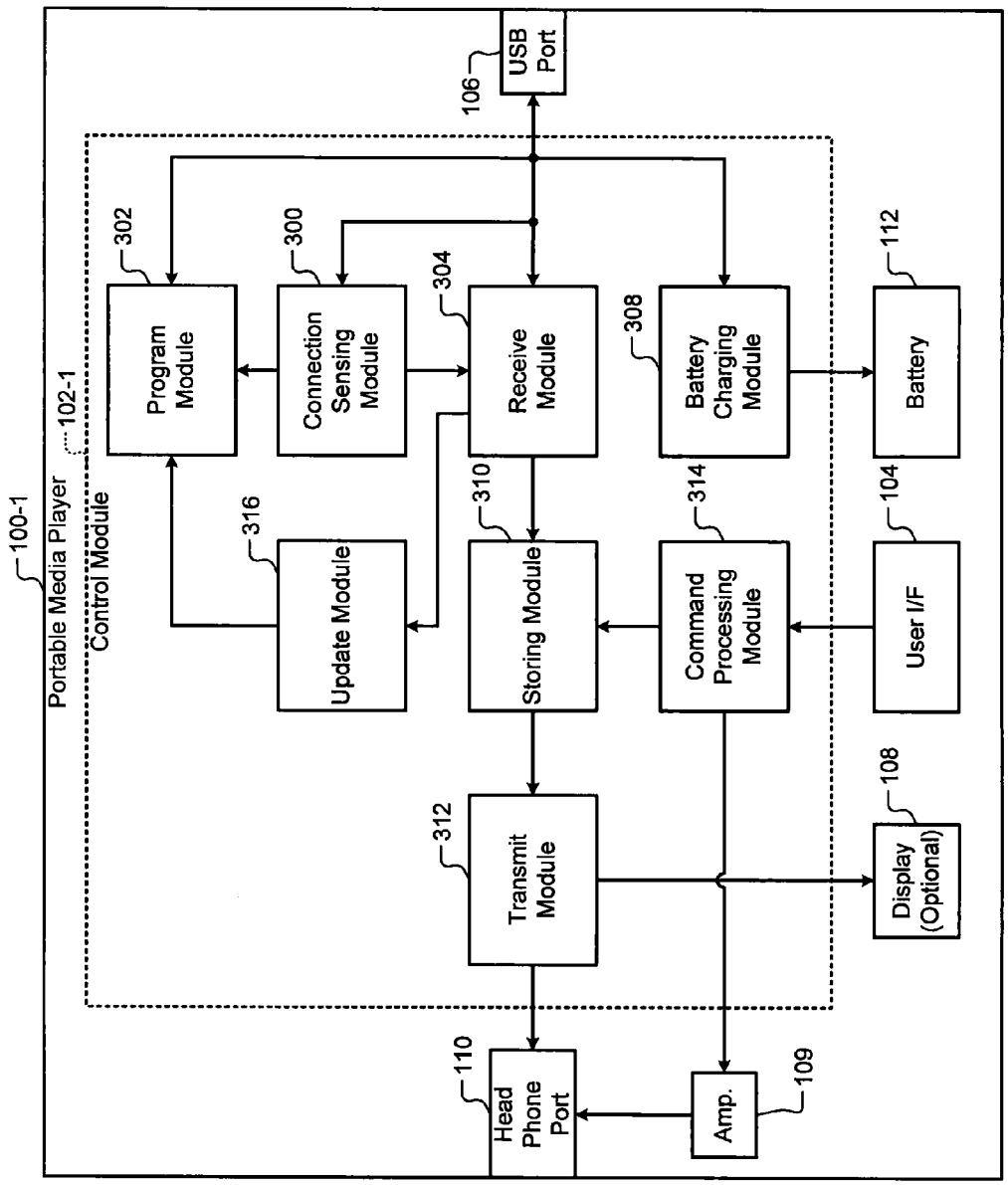
FIG. 3A is a detailed functional block diagram of the portable media player.
Figure 3B:
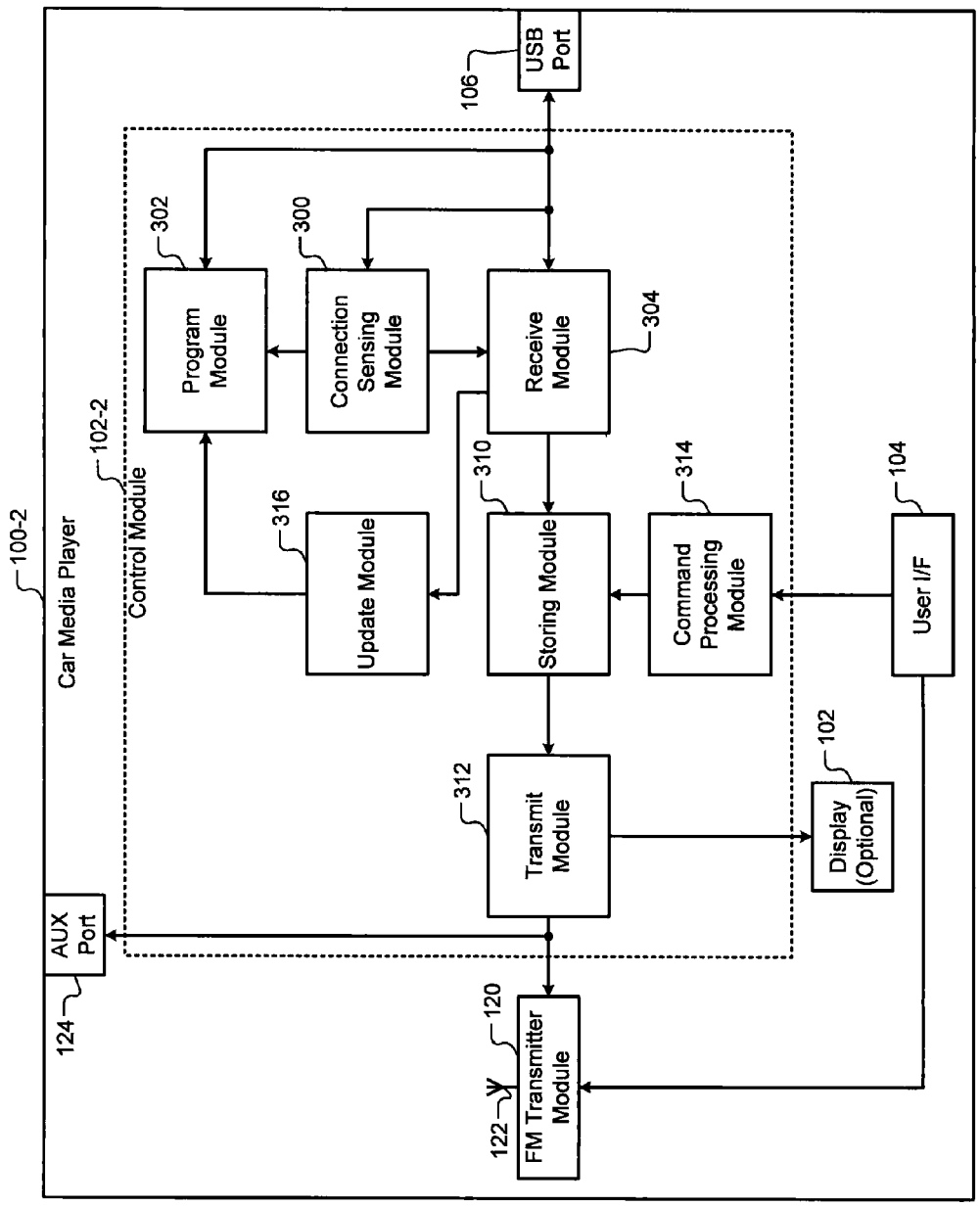
FIG. 3B is a detailed functional block diagram of the car media player that works in a vehicle.

Referring now to FIGS. 3A and 3B, the portable media player 100-1 and the car media player 100-2 are shown in further detail. In FIG. 3A, the control module 102-1 of the portable media player 100-1 is shown in detail. In FIG. 3B, the control module 102-2 of the car media player 100-2 is shown in detail.

In FIG. 3A, the control module 102-1 comprises a connection sensing module 300, a program module 302, a receive module 304 and a battery charging module 308 that communicate with the USB port 106. Additionally, the control module 102-1 may comprise a storing module 310, a command processing module 314, a transmit module 312 and an update module 316.

The connection sensing module 300 senses when the portable media player 100-1 is initially plugged into the computer 150 via the USB port 106. The program module 302 stores the program 151. The program module 302 may store the program 151 in a rewritable non-volatile memory (e.g., flash memory) included in the program module 302. The program module 302 provides access to the program 151 without user intervention when the portable media player 100-1 is plugged into the computer 150. The computer 150 reads the program 151 from the program module 302 via the USB port 106 and may execute the program 151 without user intervention.

The receive module 304 receives the compressed, encrypted digital audio files from the computer 150 via the USB port 106. Additionally, the receive module 304 receives the search criteria and any changes to the search criteria input by the user using the GUI generated by the program 151. The program module 302 saves the search criteria and/or the changes in the rewritable non-volatile memory. The program module 302 provides the saved search criteria to the program 151 when the portable media player 100-1 is plugged into the computer 150. Accordingly, if the user does not wish to change the search criteria, the last search criteria are used when the portable media player 100-1 is plugged into the computer 150.

The storing module 310 stores the compressed, encrypted digital audio files. The storing module 310 may store the compressed, encrypted digital audio files in a rewritable non-volatile memory (e.g., flash memory) included in the storing module 310. The user may select one or more of the encrypted audio files to play using the user interface 104. The storing module 310 outputs the selected audio files in uncompressed and decrypted form to the transmit module 312. The transmit module 312 transmits the uncompressed and decrypted audio files to the headphones 114 via the headphone jack 110.

The user may utilize the user interface 104 to control loudness (i.e., volume) of the analog audio content played through the headphones. The amplifier 109 receives the user input from the command processing module 314. The amplifier 109 amplifies and controls volume of audio signals output to the headphones 114 based on the user input.

After listening to the audio files, the user may utilize the user interface 104 to save or delete one or more of the encrypted audio files. Alternatively, the user may listen to the streaming audio content (which is eventually saved as an audio file on the car media player 100-2) as the streaming audio content is received and recorded by the computer 150. Subsequently, the user may elect to delete the streamed audio content from the device through the computer GUI 150 before the content is transmitted to the car media player 100-2 as an encrypted audio stream.

Encrypted audio files are automatically saved in the storing module 310. The user may enter a delete command via the user interface 104 to delete an encrypted audio file from the storing module 310. Alternatively, the storing module 310 may store the encrypted audio files on a first in first out basis (FIFO) if the user does not save/delete the encrypted audio files using save/delete commands. Storing the encrypted audio files may depend on the memory available in the storing module 310 and the size of the encrypted audio files.

The command processing module 314 processes commands entered by the user via the user interface 104. The storing module 310 may output the encrypted audio files to the transmit module 312 according to the commands (e.g., select, play, rewind, fast-forward, etc.). Additionally, the storing module 310 may save and/or delete the encrypted audio files according to the commands.

The encrypted audio files cannot be played without the program 151. For example, the streamed, uncompressed digital audio files can be played on the computer 150 before transfer while the recording process is taking place. Alternatively, the encrypted audio files can be stored on the portable media player 100-1. However, the encrypted audio files stored by the portable media player 100-1 cannot be played outside the portable media player 100-1 or otherwise accessed or copied to a different electronic device, for example the computer 150 running the program 151. Further, the encrypted audio files cannot be copied and played on both the computer 150 and the portable media player 100-1 at the same time.

In some implementations, the storing module 310 may store the encrypted audio files in a hidden partition in memory. Mass storage class drivers cannot access the hidden partition. Accordingly, the encrypted audio files stored in the hidden partition in the storing module 310 cannot be moved from the portable media player 100-1 back to the computer 150 or on to any other device.

More specifically, when stored in the hidden partition in the storing module 310, the computer 150 may be unable to access and/or list the encrypted audio files. Accordingly, the computer 150 may be unable to manipulate the encrypted audio files stored in the storing module 310. Additionally, the portable media player 100-1 does not include a copy command. Accordingly, the user may be unable to transmit the encrypted audio files from the portable media player 100-1 to any computer or device.

Occasionally, when the portable media player 100-1 is unplugged from the computer 150, the receive module 304 may not receive an encrypted audio file in its entirety. For example, the encrypted audio file may not be received in its entirety if the transfer of the encrypted audio file from the USB port 156 to the USB port 106 is in progress when the portable media player 100-1 is unplugged from the computer 150.

Consequently, the encrypted audio file may be only partially received. The program 151 senses when the portable media player 100-1 is unplugged from the computer 150. Alternatively, the receive module 304 may detect when the encrypted audio file is only partially received. Accordingly, when the portable media player 100-1 is unplugged from the computer 150, the receive module 304 may discard the encrypted audio file that is only partially received.

The battery charging module 308 charges the battery 112 when the portable media player 100-1 is connected to the computer 150 via the USB port 106 or other power source. The battery charging module 308 draws power from the computer 150 via the USB ports 106, 156 to charge the battery 112.

The update module 316 updates the program 151 and/or other configuration settings (e.g., command set available to the user, display settings, battery settings, etc.) of the portable media player 100-1. Specifically, when the portable media player 100-1 is plugged into the computer 150, the program 151 currently running on the computer preferably automatically, checks via the Internet, if an update (i.e., a new version of the program 151) is available on a manufacturer's server. If an update is available, the program 151 coordinates downloading and storing of the update, over the Internet, on to the portable media player 100-1. The update may be in the form of blocks of binary data.

The program 151 transfers the blocks of binary data from the computer 150 to the portable media player 100-1 via the USB ports 106, 156. The receive module 304 receives the blocks of binary data and outputs the blocks of binary data to the update module 316. The update module 316 may store the blocks of binary data in a binary partition of the rewritable non-volatile memory that stores the program 151. When the blocks of binary data (i.e., the new version of the program 151) are written in the rewritable non-volatile memory, the new version of the program 151 may begin to operate.

Typically, the blocks of binary data are received and transferred to the portable media player 100-1 securely. For example, the binary data may be encrypted. The update module 316 may decrypt the binary data before writing the binary data into the binary partition of the rewritable non-volatile memory.

The program 151 may periodically check for updates as follows. The program 151 may automatically log into a website. For example, the website may be a website of a manufacturer of the portable media player 100-1. Additionally or alternatively, the website may be a website authorized by the manufacturer to update the portable media player 100-1. For example, the website may be a website of a developer of the program 151.

When an update is available, the program 151 automatically downloads the update from the website onto the portable media player 100-1. Specifically, the communication module 160 of the computer 150 downloads the update from the website via the Internet 190 and transmits the update to the portable media player 100-1 via the USB ports 156, 106. The receive module 304 receives the update and outputs the update to the update module 316. The update module 316 updates the program 151 stored in the program module 302.

The update may be received securely (e.g., using encryption) and may be decrypted before writing over the program 151 stored in the program module 302. Further, the update may preserve selections (i.e., search criteria) of the user stored in the program module 302. Additionally, the update may preserve the encrypted audio files stored in the storing module 310.

In some implementations, the update module 316 may update configurations and setting of other modules. For example, the update module 316 may update the following. The update module 316 may update the display settings of the display 108. The update module 316 may update the command set of the command processing module 314. The update module 316 may update the battery settings of the battery 112, and so on.

In FIG. 3B, the control module 102-2 comprises the connection sensing module 300, the program module 302, the receive module 304, the storing module 310, the command processing module 314, the transmit module 312, and the update module 316. These modules perform the functions described with reference to FIG. 3A.

The transmit module 312 outputs the encrypted audio files from the storing module 310 to the FM transmitter module 120 and the AUX output port 124. The user may tune the FM transmitter module 120 to a frequency of the FM receiver module 254. Alternatively, the FM transmitter module 120 may automatically tune to an unused FM frequency of the FM receiver module 254. When tuned, the FM transmitter module 120 converts the encrypted audio files into an analog format and then transmits an audio stream to the FM receiver module 254. The FM receiver module 254 receives the encrypted audio files in the analog format. The FM receiver module 254 amplifies signals in the analog format and outputs the amplified signals in the analog format to the speaker 258.

Alternatively, the user may connect a cable from the AUX output port 124 to the AUX input port 260. The audio files transmitted by the transmit module 312 are output to the FM receiver module 254 via the AUX output port 124, the cable, and the AUX input port 260. The FM receiver module 254 amplifies signals in the analog format and outputs the amplified signals in the analog format to the speaker 258.

Figure 4:
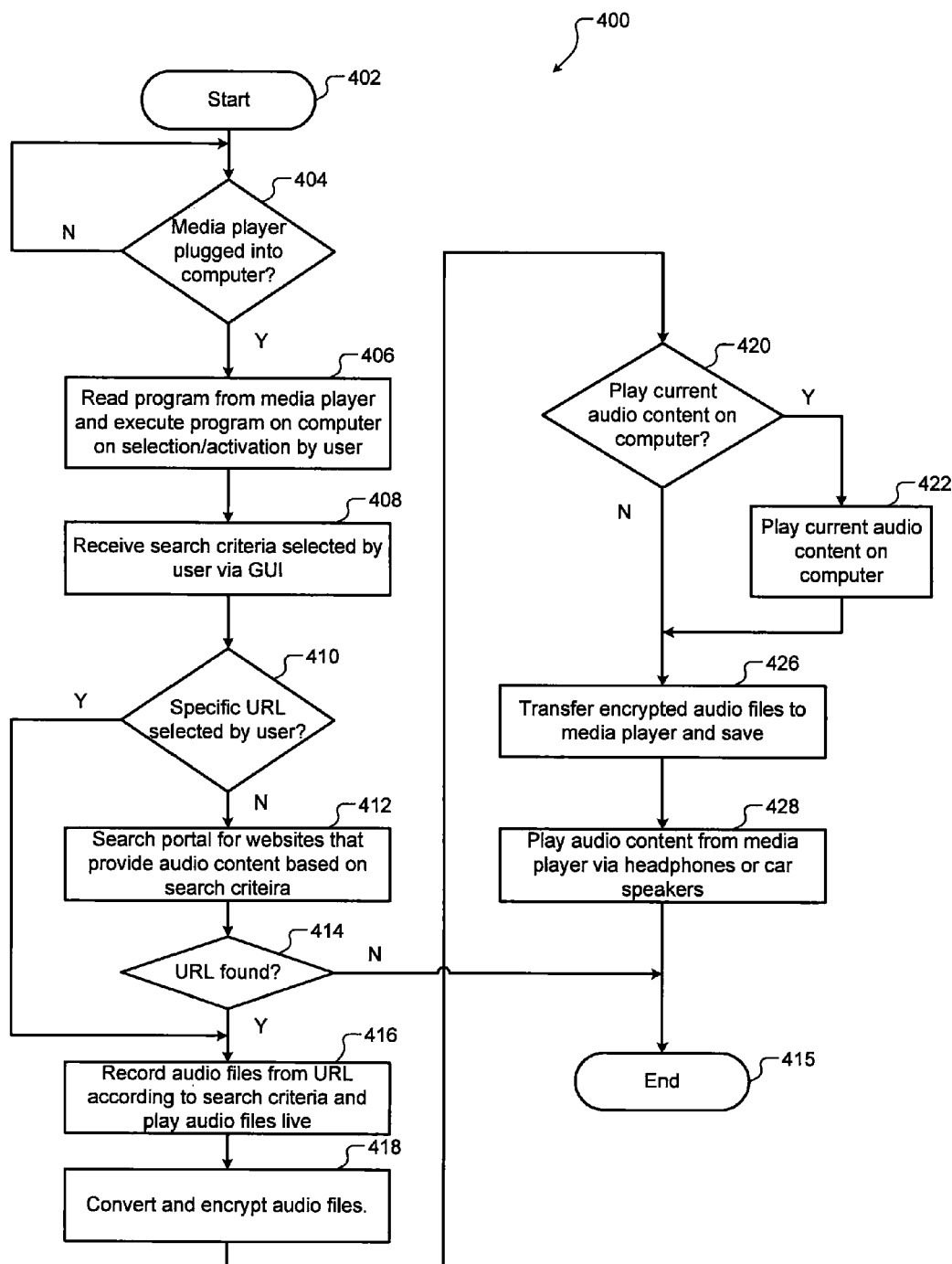
FIG. 4 is a flowchart of a method for recording audio files from the Internet on the portable media player and the car media player.

Referring now to FIG. 4, a method 400 for recording audio files from the Internet on either the portable media player 100-1 and the car media player 100-2 is shown. For convenience, the following discussion will assume that the portable media player 100-1 is being used, but the operation for downloading streamed media content will be the same to both devices.

The method begins at operation 402. At operation 404 a determination is made by the connection sensing module 300 if the portable media player 100-1 is plugged into the computer 150. If no connection is detected, then the connection sensing module 300 waits until the media player is plugged into the computer 150. At operation 406, when the media player is plugged into the computer, the communication module 160 of the computer 150 copies the program 151 from the portable media player 100-1 and executes the program 151 on the computer 150. The user may then be notified through a suitable dialog box on the GUI displayed on the computer's display 158, or by any other suitable means, of the opportunity to select/activate the program 151 on the computer 150 to begin execution of the program on the computer 150.

At operation 408 the GUI receives search criteria (e.g., a specific URL, genre, and so on) selected by the user. At operation 410 the communications module 160 determines if a specific URL is selected by the user from which to record streaming digital audio content. At operation 412, if the user does not select a specific URL, then the communications module 160 of the computer 150 searches the portal 194 for websites that provide selected audio content. At operation 414 the communications module 160, using the program 151, determines if a URL that provides the selected audio stream is found. The searching is terminated at operation 415 if no URL is found by the communications module 160.

At operation 416, if the user specifies a URL at operation 410 or if a URL is found at operation 414, the communications module 160 records audio files from the URL according to the search criteria and may play the digital audio files as they are streamed into the computer 150. At operation 418, the communications module 160 decompresses, converts and encrypts the audio files. At operation 420, the communications module 160 determines if the user selects playing current audio content of the encrypted audio files on the computer 150. At operation 422, the communication module 160 and the program 151 control playback of the audio content on the computer 150 if the user selects playing current audio content of the encrypted audio files on the computer.

At operation 426, the communications module 160 and the program 151 control the transfer of the encrypted content from the computer 150 to the portable media player 100-1 where it may be saved. The transfer occurs automatically and seamlessly as by the computer 150 during the recording process. At operation 428, depending on user input, the control module 102-1 of the portable media player 100-1 plays back the stored audio content from the encrypted audio files that it has stored. Depending on the implementation of the media player (either portable or car), the stored audio content may be played back from the portable media player 100-1 to the user headphones or from the car media player 100-2 to the vehicle's speakers 258. The method then ends at operation 415.

In other features, the systems and methods described above are implemented by a computer program executed by one or more processors. The computer program can reside on a tangible computer readable medium such as but not limited to memory, nonvolatile data storage, and/or other suitable tangible storage mediums.

The detailed description and specific examples are intended for purposes of illustration only and are not intended to limit the scope of the disclosure. For example, the portable media player 100-1 and the car media player 100-2 described herein could readily be combined into a single unit. The power cord that would couple the car media player 100-2 to the CLA jack 252 could easily be made to be removable from the media player when it is not needed for use. Attaching the power cord would then adapt the portable media player 100-1 specifically for use within the vehicle. Even with the inclusion of the FM transmitter module 120 and antenna 122 and associated electronics, it is expected that the media player would still provide a highly compact and easily carried device that could be used in the home or office. Still further areas of applicability of the present disclosure will become apparent from the detailed description and the drawings.

The broad teachings of the disclosure can be implemented in a variety of forms. Therefore, while this disclosure includes particular examples, the true scope of the disclosure should not be so limited since other modifications will become apparent upon a study of the drawings and the specification.

What is claimed is:

1. A method of providing stored digital audio content to a remotely located frequency modulated (FM) radio having a tunable FM receiver, comprising:
    using a portable media player having a control module to store a program, the program configured to facilitate recording of the streamed digital content over the WAN;
    configuring the portable media player to have a user interface that includes a plurality of controls to enable a user to control a playback of the streamed digital content on the portable media player and to select a specific FM frequency that audio content will be transmitted on from the portable media player;
    when the portable media player is placed in communication with an external computing device, causing the program of the portable media player to be loaded onto the external computing device over an established communications link between the portable media player and the external computing device, and to obtain, using the program while running on the external computing device, selected digital audio content being broadcast from a remote content source over a wide area network;
    using the program to relay the selected digital audio content received by the external computing device to the portable media player and to store the selected digital content on the media player;
    breaking the communications link between the portable media player and the external computing device;
    placing the portable media player within a predetermined proximity of the FM receiver; and
    upon receiving a command at the portable media player, using an FM transmitter of the portable media player to wirelessly transmit the stored selected digital content, in analog form, to the FM receiver on the specific FM frequency, for playback on the FM radio.

2. The method of claim 1, wherein the FM radio is located in a vehicle, and further comprising powering the portable media player from a power source associated with the vehicle.

3. The method of claim 1, further comprising using the program to encrypt the selected digital audio content received by the external computing device into encrypted, selected digital audio content.

4. The method of claim 3, further comprising using the program to store the encrypted, selected digital audio content in a memory of the digital media player.

5. The method of claim 4, further comprising using the program to decrypt the encrypted, selected digital audio content into decrypted digital content prior to transmitting the decrypted digital content, via the FM transmitter, from the portable media player to the FM receiver.

6. The method of claim 1, further comprising using a visual display on the portable media player to display information to at least one of the specific FM frequency selected, and names of digital audio files stored in the portable media player.

7. The method of claim 1, further comprising using a headphone jack on the portable media player to provide an audio output of the stored, selected digital audio content to a user.

\* \* \* \* \*